(12) United States Patent
Sharma et al.

(10) Patent No.: US 7,046,819 B2
(45) Date of Patent: May 16, 2006

(54) ENCODED REFERENCE SIGNAL FOR DIGITAL WATERMARKS

(75) Inventors: Ravi K. Sharma, Hillsboro, OR (US); John Stach, Tualatin, OR (US)

(73) Assignee: Digimarc Corporation, Beaverton, OR (US)

( * ) Notice: Subject to any disclaimer, the term of this patent is extended or adjusted under 35 U.S.C. 154(b) by 603 days.

(21) Appl. No.: 10/132,060

(22) Filed: Apr. 24, 2002

(65) Prior Publication Data

US 2003/0012401 A1  Jan. 16, 2003

Related U.S. Application Data

(60) Provisional application No. 60/286,701, filed on Apr. 25, 2001.

(51) Int. Cl.
*G06K 9/00* (2006.01)

(52) U.S. Cl. ............... 382/100; 382/233; 380/203; 713/176

(58) Field of Classification Search ........... 382/100, 382/112, 162, 182, 169–172, 232–235, 237, 382/242, 250, 251, 191, 260, 248, 294; 235/468; 713/176; 380/203, 210; 348/475
See application file for complete search history.

(56) References Cited

U.S. PATENT DOCUMENTS

| | | |
|---|---|---|
| 3,838,444 A | 9/1974 | Loughlin et al. |
| 3,984,624 A | 10/1976 | Waggener |
| 4,225,967 A | 9/1980 | Miwa et al. |
| 4,495,620 A | 1/1985 | Steele et al. |
| 4,963,998 A | 10/1990 | Maufe |
| 5,461,426 A | 10/1995 | Limberg et al. |
| 5,612,943 A | 3/1997 | Moses et al. |
| 5,663,766 A | 9/1997 | Sizer, II |
| 5,822,436 A * | 10/1998 | Rhoads .................. 380/54 |
| 5,835,639 A | 11/1998 | Honsinger et al. |
| 5,857,038 A | 1/1999 | Owada et al. |
| 5,859,920 A | 1/1999 | Daly et al. |
| 5,940,135 A | 8/1999 | Petrovic et al. |
| 5,949,055 A | 9/1999 | Fleet et al. |
| 6,011,857 A | 1/2000 | Sowell et al. |
| 6,044,182 A | 3/2000 | Daly et al. |
| 6,122,403 A * | 9/2000 | Rhoads ................. 382/233 |

(Continued)

OTHER PUBLICATIONS

U.S. Appl. No. 60/257,924, filed Dec. 21, 2000, Sharma.

(Continued)

*Primary Examiner*—Kanjibhai Patel
*Assistant Examiner*—Seyed Azarian
(74) *Attorney, Agent, or Firm*—Digimarc Corporation

(57) ABSTRACT

This disclosure describes a method for encoding a digital watermark into an image signal that is robust to geometric distortion. The digital watermark is adapted to the host image signal in which it is embedded so as to be imperceptible or substantially imperceptible in the watermarked image when displayed or printed. This digital watermark may be used to determine the geometric distortion applied to a watermarked image, may be used to carry auxiliary information, and may be used to detect and decode a digital watermark embedded in a geometrically distorted version of a watermarked image. Because of its robustness to geometric distortion, the digital watermark is useful for a number of applications for embedding auxiliary data in image signals, including still pictures and video, where the image signal is expected to survive geometric distortion.

This method may adapted to other types of media signals such as audio.

15 Claims, 2 Drawing Sheets

U.S. PATENT DOCUMENTS

| | | | |
|---|---|---|---|
| 6,145,081 | A | 11/2000 | Winograd et al. |
| 6,272,176 | B1 | 8/2001 | Srinivasan |
| 6,385,329 | B1 | 5/2002 | Sharma et al. |
| 6,400,826 | B1 * | 6/2002 | Chen et al. ................ 382/100 |
| 6,404,926 | B1 | 6/2002 | Miyahara et al. |
| 6,408,082 | B1 | 6/2002 | Rhoads et al. |
| 6,424,725 | B1 | 7/2002 | Rhoads et al. |
| 6,427,012 | B1 | 7/2002 | Petrovic |
| 6,483,927 | B1 * | 11/2002 | Brunk et al. ................ 382/100 |
| 6,512,837 | B1 * | 1/2003 | Ahmed ...................... 382/100 |
| 6,516,079 | B1 | 2/2003 | Rhoads et al. |
| 6,571,144 | B1 | 5/2003 | Moses et al. |
| 6,577,747 | B1 | 6/2003 | Kalker et al. |
| 6,614,914 | B1 | 9/2003 | Rhoads et al. |
| 6,671,388 | B1 | 12/2003 | Op De Beeck et al. |
| 6,683,966 | B1 * | 1/2004 | Tian et al. ................. 382/100 |
| 6,775,392 | B1 * | 8/2004 | Rhoads ...................... 382/100 |
| 6,952,486 | B1 | 10/2005 | Yamakage et al. |
| 2002/0021721 | A1 | 2/2002 | Jiang et al. |
| 2002/0097873 | A1 | 7/2002 | Petrovic |
| 2002/0114491 | A1 | 8/2002 | Sharma et al. |
| 2003/0086587 | A1 | 5/2003 | Haitsma et al. |

OTHER PUBLICATIONS

Bender, "Techniques for Data Hiding", IBM Systems Journal, vol. 35, Nos. 3&4, 1996, pp. 313-336.

Haitsma, "Audio Watermarking for Monitoring and Copy Protection", Philips Research Laboratories, pp. 119-122.

Kutter, "Watermark Resisting to Translation, Rotation, and Scaling", Part of the SPIE Conference on Multimedia Systems and Applications, SPIE vol. 3528, Nov. 1998, pp. 423-431.

Zhao, "Embedding Robust Labels into Images for Copyright Protection", Proc. Of the International Congress on Intellectual Property Rights for Specialized Information, Knowledge and New Technologies, Vienna, Austria, Aug. 21-25, 1995, 10 pages.

U.S. Appl. No. 10/032,282, filed Dec. 20, 2001, mailed on Jan. 24, 2005.

* cited by examiner

ENCODED REFERENCE SIGNAL FOR DIGITAL WATERMARKS

TECHNICAL FIELD

The present application claims benefit of provisional application No. 60/286,701, filed Apr. 25, 2001, which is hereby incorporated by reference.

BACKGROUND

Digital watermarking is a process for modifying physical or electronic media to embed a machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the watermark in a host media signal, and a decoder that detects and reads the embedded watermark from a signal suspected of containing a watermark (a suspect signal). The encoder embeds a watermark by altering the host media signal. The reading component analyzes a suspect signal to detect whether a watermark is present. In applications where the watermark encodes information, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's application Ser. No. 09/503,881 (Now U.S. Pat. No. 6,614,914), Ser. No. 60/278,049 and U.S. Pat. No. 6,122,403, which are hereby incorporated by reference.

DETAILED DESCRIPTION

This disclosure describes a method for encoding a digital watermark into an image signal that is robust to geometric distortion. The digital watermark is adapted to the host image signal in which it is embedded so as to be imperceptible or substantially imperceptible in the watermarked image when displayed or printed. This digital watermark may be used to determine the geometric distortion applied to a watermarked image, may be used to carry auxiliary information, and may be used to detect and decode a digital watermark embedded in a geometrically distorted version of a watermarked image. Because of its robustness to geometric distortion, the digital watermark is useful for a number of applications for embedding auxiliary data in image signals, including still pictures and video, where the image signal is expected to survive geometric distortion.

This method may be adapted to other types of media signals such as audio.

The digital watermarking system includes an embedder and a detector. The embedder embeds the digital watermark into a host media signal so that it is substantially imperceptible. The detector reads the watermark from a watermarked signal.

Figure 1:
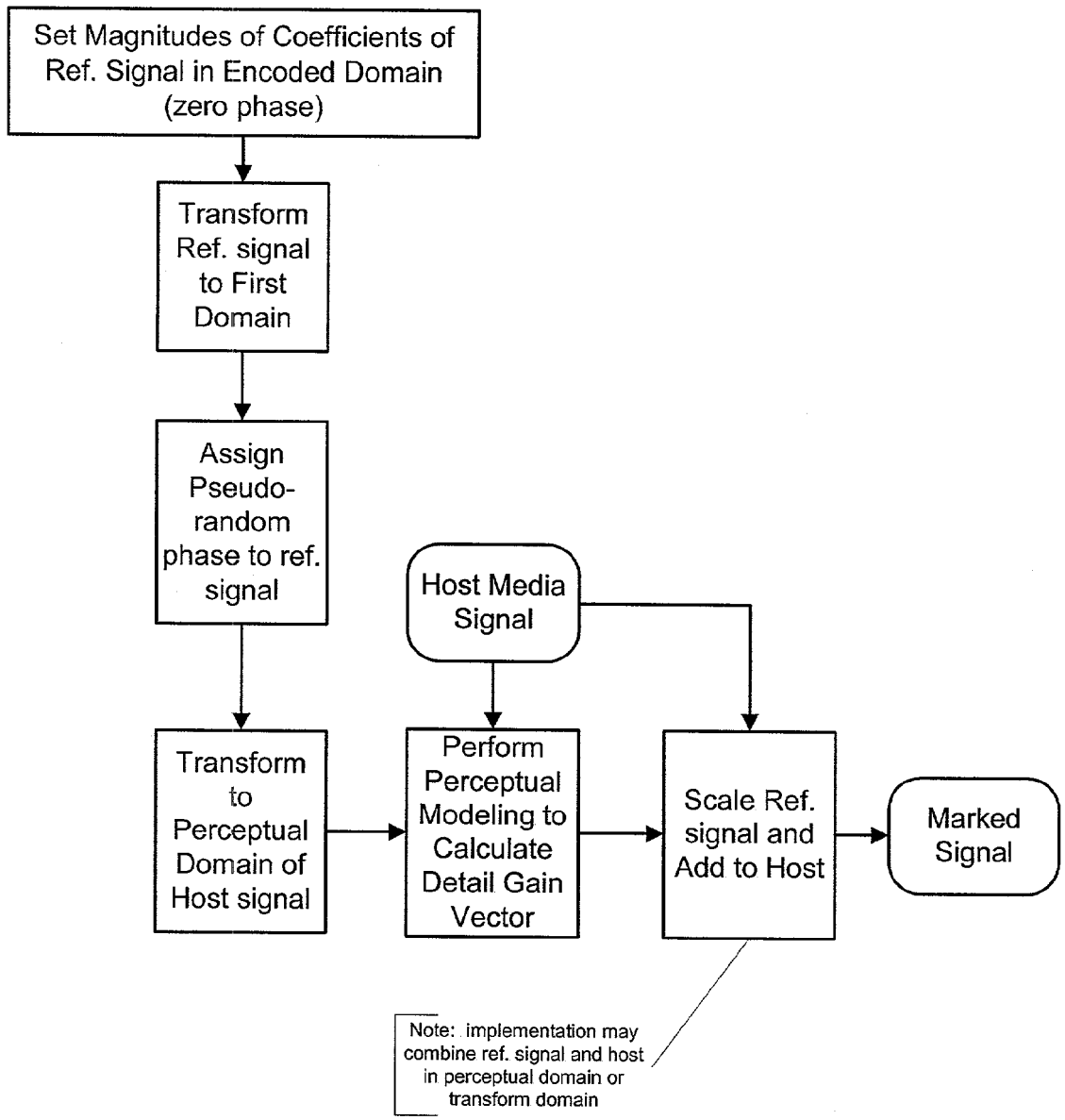
FIG. 1 is a diagram illustrating a digital watermark embedder.

FIG. 1 is a diagram illustrating a digital watermark embedder.

The embedder encodes a reference signal into a particular transform domain of the host media signal, called the encoded domain. The embedding of the reference signal may use a secret key. Also, the encoded reference signal can be embedded so that it is dependent on the host signal by using some attributes of the host signal to create the encoded reference signal. For example, a hash of attributes of the host media signal may be used as a key to encode the reference signal in the encoded domain. The hash is preferably robust to manipulation of the host signal, including changes due to embedding the digital watermark, so that it can be derived from the watermarked signal and used to decode the embedded watermark. Examples of hashes include most significant bits of image samples, low frequency components (e.g., low frequency coefficients, a low pass filtered, sub sampled and/or compressed version of the host signal or signal attributes).

The following describes a digital watermark embedder and detector for images. First, the embedder creates the reference signal in the encoded domain. The encoded domain is a transform domain of the host image. In this particular example, the relationship between the spatial domain of the host image and the encoded domain is as follows. To get from the image to the encoded domain, the image is transformed to a first domain, and then the first domain data is transformed into the encoded domain.

The embedder starts with a reference signal with coefficients of a desired magnitude in the encoded domain. These coefficients initially have zero phase. Next, the embedder transforms the signal from the encoded domain to the first transform domain to recreate the magnitudes in the first transform domain.

The selected coefficients may act as carriers of a multi-bit message. For example, in one implementation, the multi-bit message is selected from a symbol alphabet comprised of a fixed number of coefficients (e.g., 64) in the encoded domain. The embedder takes a desired message, performs error correction coding, and optional spreading over a PN sequence to produce a spread binary signal, where each element maps to 1 of the 64 coefficients. The spreading may include taking the XOR of the error correction encoded message with a PN sequence such that the resulting spread signal has roughly the same elements of value 1 as those having a value of 0. If an element in the spread signal is a binary 1, the embedder creates a peak at the corresponding coefficient location in the encoded domain. Otherwise, the embedder makes no peak at the corresponding coefficient location. Some of the coefficients may always be set to a binary 1 to assist in detecting the reference signal.

Next, the embedder assigns a pseudorandom phase to the magnitudes of the coefficients of the reference signal in the first transform domain. The phase of each coefficient can be generated by using a key number as a seed to a pseudorandom number generator, which in turn produces a phase value. Alternatively, the pseudorandom phase values may be computed by modulating a PN sequence with an N-bit binary message.

Now, the embedder has defined the magnitude and phase of the reference signal in the first transform domain. It then transforms the reference signal from the first domain to the perceptual domain, which for images, is the spatial domain. Finally, the embedder adds the reference signal to the host image. Preferably, the embedder applies a gain factor to the reference signal that scales the reference signal to take advantage of data hiding characteristics of the host image. For examples of such gain calculations see the patent documents incorporated by reference above.

In one implementation, the first transform domain is a 2D Fourier domain computed by taking an FFT of a block of the host image. The encoded domain is computed by performing a 2D transform of the first transform domain. To create the reference signal, the magnitude of the coefficients of the encoded domain are set to desired levels. These coefficients have zero phase. This signal is then re-created in the first domain by taking the inverse FFT of the reference signal in the encoded domain. Next, the embedder sets the phase of the signal in the first domain by generating a PN sequence and mapping elements of the PN sequence to coefficient locations in the first domain. Finally, the embedder computes the inverse FFT of the signal, including its magnitude components and phase components, to get the spatial domain version of the reference signal. This spatial domain signal is scaled and then added to the host signal in the spatial domain. This process is repeated for contiguous blocks in the host image signal, such that the embedded signal is replicated across the image.

The host image and reference signal may be added in the first transform domain and then inversely transformed using in inverse FFT to the spatial domain.

The embedder may use a key to specify the magnitudes of the coefficients in the encoded domain and to generate the random phase information of the reference signal in the first transform domain. The locations and values of the coefficients of the reference signal in the encoded domain may be derived from the host image, such as by taking a hash of the host image. Also, a hash of the host image may be used to compute a key number for a pseudorandom number generator that generates the pseudorandom phase of the reference signal in the first transform domain.

The above embedding technique may be combined with other digital watermarking methods to encode auxiliary data. In this case, the reference signal is used to correct for geometric distortion. Once the geometric distortion is compensated for using the reference signal, then a message decoding technique compatible with the encoder extracts the message data. This auxiliary data may be hidden using the techniques described in the patent documents reference above or other known techniques described in digital watermarking literature.

Figure 2:
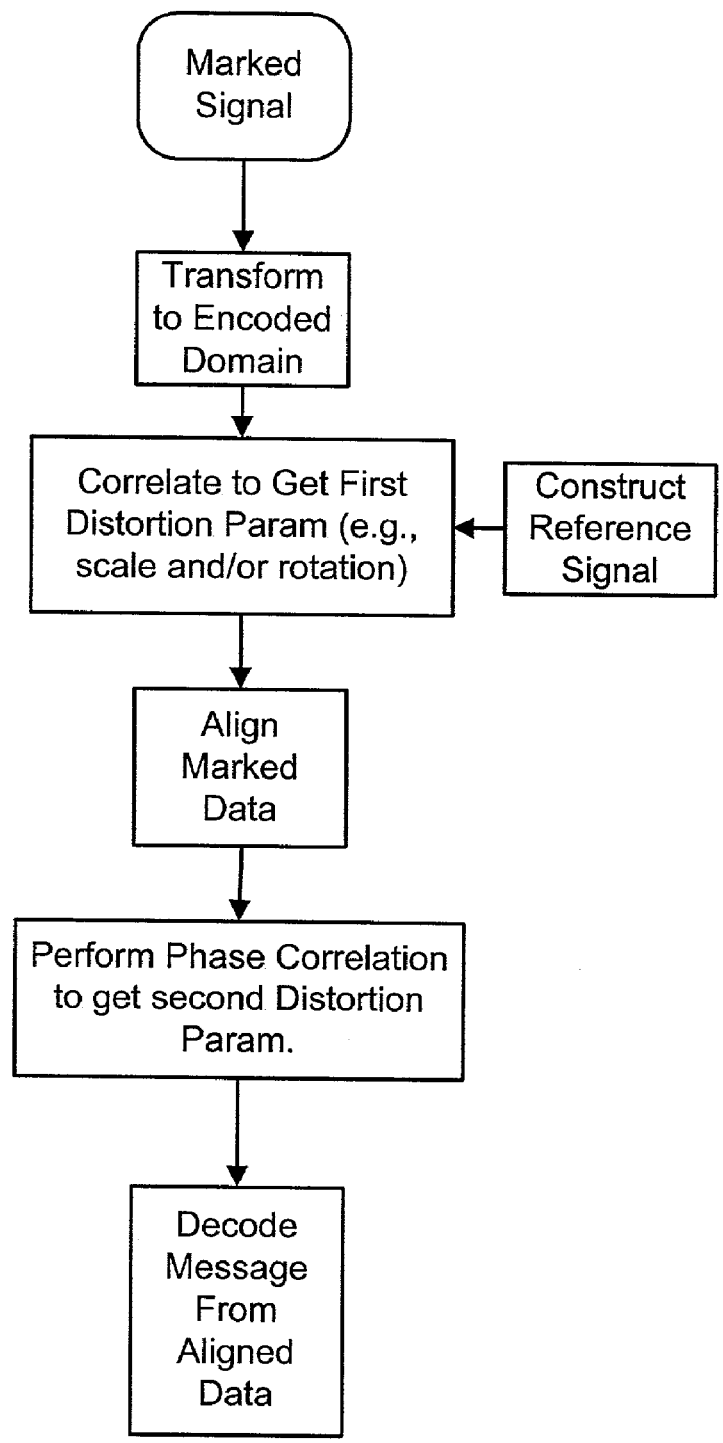
FIG. 2 is a diagram illustrating a digital watermark detector compatible with the embedder of FIG. 1.

FIG. 2 is a diagram illustrating a digital watermark detector compatible with the embedder of FIG. 1.

The detector operates on portions of a signal suspected of containing a digital watermark that has been embedded as described above. First, it creates a specification of the magnitudes of the reference signal in the encoded domain. If the magnitudes were specified by a key, the detector first reads the key or derives it from the watermarked signal. It then constructs a copy of the magnitudes of the reference signal in the encoded domain and uses it to align the watermarked image. If the magnitudes were specified by encoding an N bit message in selected ones of the 64 coefficients, then a proxy for the reference signal is created as a series of peaks at all 64 locations.

To align the watermarked image, the detector transforms the image into the first transform domain and sets the phase to zero. It then transforms the magnitudes of the watermarked image in the first domain into the encoded domain. In the encoded domain, the detector correlates the copy of the reference signal constructed from the key or N bit message with the magnitude data of the watermarked image transformed from the first domain.

The detector may use any of a variety of correlation techniques, such as matched filtering or impulse filtering, to determine affined transformation parameters (e.g., rotation, scale, differential scale, shear), except translation, based on the magnitude data in the encoded domain. Examples of some correlation techniques are provided in the patent documents referenced above. One technique is to transform the magnitude information of the reference signal and watermarked image data to a log polar space using a Fourier Mellin transform and use a generalized match filter to determine the location of the correlation peak. This peak location provides an estimate of rotation and scale.

After finding the rotation and scale, the detector aligns the watermarked image data and then correlates the phase of the aligned watermarked image with the phase of the reference signal. The detector may correlate the watermarked image data with the pseudorandom carrier signal used to create the random phase, or the random phase specification itself. In the case where the pseudorandom phase of the reference signal is created by modulating a message with a pseudo-random carrier, a part of the message may remain constant for all message payloads so that the constant part can be used to provide accurate translation parameters by phase matching the reference phase with the phase of the aligned watermarked image.

Once the watermarked image is aligned using the above techniques, message data may be decoded from the watermarked image using a message decoding scheme compatible with the embedder. In the particular case where an N bit message is encoded into the magnitude of the reference signal in the encoded domain, the message decoder analyzes the 64 coefficient locations of the watermarked data in the encoded domain and assigns them to a binary value of 1 or 0 depending on whether a peak is detected at the corresponding locations. Then, the decoder performs spread spectrum demodulation and error correction decoding (e.g., using a technique compatible with the embedder such as BCH, convolution, or turbo coding) to recover the original N bit binary message.

In the particular case where the N bit message is encoded into the pseudorandom phase information of the reference signal, the decoder correlates the phase information of the watermarked signal with the PN carrier signal to get estimates of the error correction encoded bit values. It then performs error correction decoding to recover the N bit message payload.

The same technique may be adapted for audio signals, where the first domain is a time frequency spectrogram of the audio signal, and the encoded domain is an invertible transform domain (e.g., 2D FFT of the spectrogram).

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for imperceptibly embedding auxiliary data in a media signal comprising:
    setting magnitudes of a reference signal in an encoded domain;
    transforming the reference signal to a first domain, the first domain being different from the encoded domain;
    in the first domain, setting phase of the reference signal;
    transforming the magnitude and phase of the reference signal from the first domain to a perceptual domain of the media signal; and
    combining the reference signal with the media signal, including perceptually adapting the reference signal to the media signal.

2. The method of claim 1 wherein the media signal is an image signal and the perceptual domain comprises a spatial domain of the image.

3. The method of claim 1 wherein the phase of the reference signal is pseudorandom.

4. The method of claim 3 wherein the pseudorandom phase is created by spread spectrum modulating an N bit message with a pseudorandom number sequence.

5. The method of claim 1 wherein selected coefficients of the reference signal are set to encode an N bit message.

6. A computer readable medium on which is stored software for performing the method of claim 1.

7. A method for decoding a digital watermark signal imperceptibly embedded in a media signal comprising:
    creating a reference signal in an encoded domain;
    correlating the reference signal with the media signal to determine at least a first distortion parameter;
    using the first distortion parameter to align the media signal;
    correlating a phase specification of the reference signal with the aligned media signal to determine a second distortion parameter;
    using the second distortion parameter to decode the digital watermark from the media signal.

8. The method of claim 7 wherein an N bit message is decoded from phase information of the media signal by correlating the phase information with pseudorandom carrier signal.

9. The method of claim 7 wherein an N bit message is decoded from magnitude information of the watermarked signal in the encoded domain.

10. A method for decoding a digital watermark signal imperceptibly embedded in a media signal comprising:
    providing a reference signal in an encoded domain;
    correlating the reference signal with the media signal to determine at least a first distortion parameter;
    using the first distortion parameter to align the media signal;
    correlating a phase specification of the reference signal with the aligned media signal to determine a second distortion parameter;
    using the second distortion parameter to decode the digital watermark from the media signal;
    wherein an N bit message is decoded from magnitude information of the watermarked signal in the encoded domain;
    the method including:
    detecting peaks in the encoded domain of the watermarked signal;
    interpreting the peaks at predetermined locations as symbol values;
    spread spectrum demodulating the symbol values to compute an error correction encoded signal; and
    error correction decoding the error correction encoded signal to compute the N bit message.

11. The method of claim 9 including:
    detecting peaks in the encoded domain of the watermarked signal;
    interpreting the peaks at predetermined locations as symbol values; and
    error correction decoding the symbol values to compute the N bit message.

12. A computer readable medium on which is stored software for performing the method of claim 7.

13. A method for decoding a digital watermark signal imperceptibly embedded in a media signal comprising:
    providing a reference signal in an encoded domain;
    correlating the reference signal with the media signal to determine at least a first distortion parameter;
    using the first distortion parameter to align the media signal;
    detecting peaks in the encoded domain of the watermarked signal;
    interpreting the peaks at predetermined locations as symbol values; and computing an N bit message from the symbol values.

14. The method of claim 13 wherein computing the N bit message includes:
    spread spectrum demodulating the symbol values to compute an error correction encoded signal; and
    error correction decoding the error correction encoded signal to compute the N bit message.

15. The method of claim 7 wherein:
    the correlating of the reference signal with the media signal to determine at least a fisrt distortion parameter is performed in a first domain; and
    the correlating of the phase specification of the reference signal with the aligned media signal to determine a second distortion parameter is performed in a second domain different from the first domain.

* * * * *